United States Patent [19]

Arai et al.

[11] 4,113,280
[45] Sep. 12, 1978

[54] SEAT BELT DEVICE FOR USE IN VEHICLE

[75] Inventors: Hiroshi Arai, Ohbu; Mamoru Mori, Okazaki, both of Japan

[73] Assignee: Toyota Jidosha Kogyo Kabushiki Kaisha, Toyota, Japan

[21] Appl. No.: 765,392

[22] Filed: Feb. 3, 1977

[30] Foreign Application Priority Data

Feb. 19, 1976 [JP] Japan .............................. 51-18751[U]

[51] Int. Cl.² ........................ A62B 35/00; B60R 21/10
[52] U.S. Cl. .................................... 280/747; 297/388; 297/389
[58] Field of Search ............. 280/747, 745; 180/82 C; 297/388, 389

[56] References Cited

U.S. PATENT DOCUMENTS

| 3,348,881 | 10/1967 | Weman | 280/747 X |
| 3,351,382 | 11/1967 | Davies | 297/389 |
| 3,494,665 | 2/1970 | Klink | 297/389 |
| 3,549,203 | 12/1970 | Rawson | 297/388 |
| 3,618,975 | 11/1971 | Bombach | 297/389 X |
| 3,982,769 | 9/1976 | Färlind | 280/744 |

FOREIGN PATENT DOCUMENTS

745,012 10/1966 Canada ..................... 297/389

*Primary Examiner*—Bruce H. Stoner, Jr.
*Assistant Examiner*—Michael J. Forman
*Attorney, Agent, or Firm*—Stevens, Davis, Miller & Mosher

[57] ABSTRACT

A seat belt device for holding an occupant of a seat of a vehicle by the shoulder and the waist portions thereof by stringing a belt in a loop fashion, wherein the coupling ends of the shoulder belt and the lap belt portions of the belt are overlapped one on the other, thereby preventing the tongue plate from slipping down along the belt when the same is not in use.

4 Claims, 4 Drawing Figures

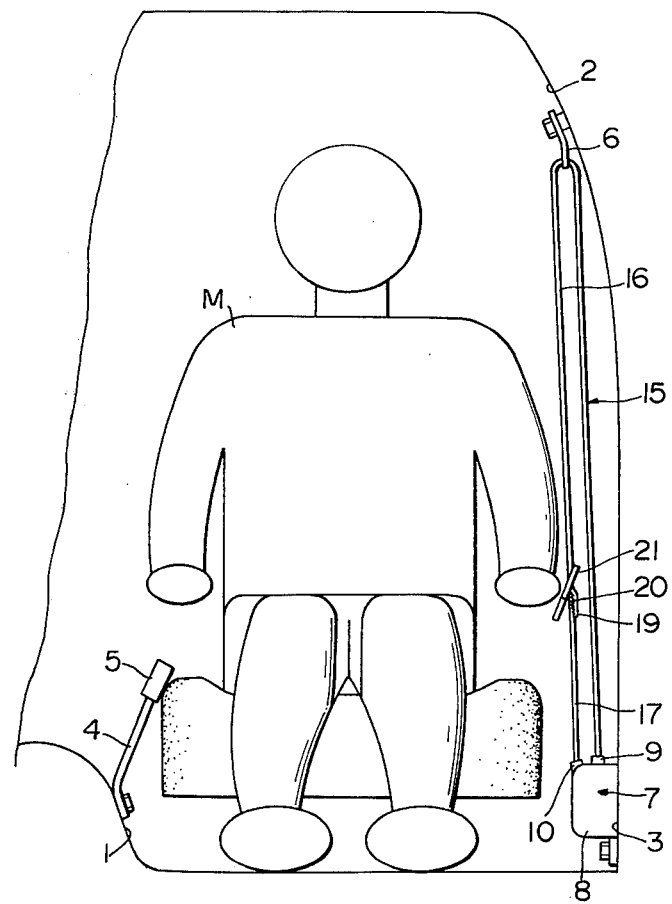
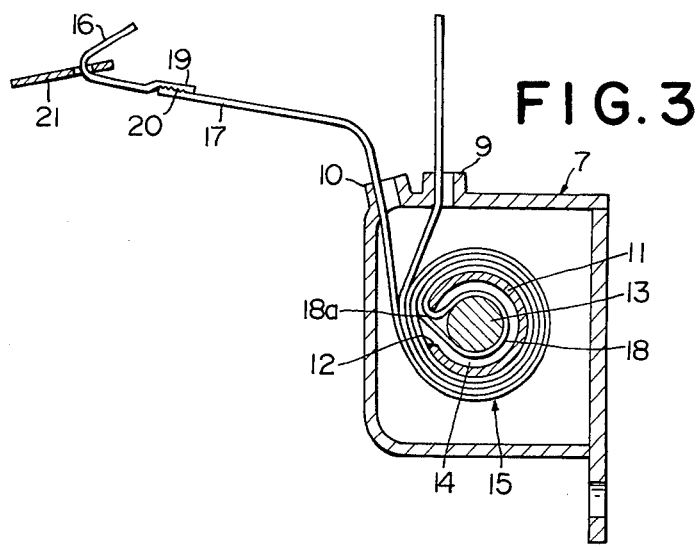

SEAT BELT DEVICE FOR USE IN VEHICLE

The present invention is related to a seat belt device for use in a vehicle and, more particularly, to an improvement on such a seat belt device, in which a belt is strung in a loop fashion so as to hold an occupant of the seat of a vehicle by the shoulder and the waist portions thereof, and coupling ends of the belt are wound on the shaft of a single retractor while being overlapped one on the other.

The arrangement of a seat belt device in which a belt is strung in a loop fashion so as to hold an occupant of a seat of the vehicle by the shoulder and waist portions thereof and wherein coupling ends of the belt are overlapped one on the other and wound on the shaft of a single retractor has been already proposed. However, in such a seat belt device, the belt takes a vertically disposed position and a tongue plate provided thereon is disengaged when the occupant takes off the belt; as a result thereof, the tongue plate slips down to a point close to the floor of the vehicle. Therefore, before the occupant can wear the seat belt again, the occupant must onerously bend down to find the tongue plate and subsequently extend the belt.

In order to resolve the aforementioned shortcoming of the conventional seat belt device, it is common to provide a tongue plate stopper 22 on the belt 15, as shown in FIG. 4 of the accompanying drawings, to prevent the tongue plate 21 from slipping down. However, in such a means for preventing the tongue plate from slipping down as mentioned above, an additional step is required to attach onto the belt 15 the tongue plate stopper 22, which is manufactured separately from the belt.

Accordingly, an object of the present invention is to provide a means for preventing the tongue plate from slipping down along the belt when the seat belt is not in use without the use, of an additional tongue belt stopper, thereby providing a seat belt device of a simplified construction which can eliminate the inconvenience of looking for the tongue plate before the occupant can wear the belt.

These and other objects and advantages of the present invention will be fully understood from the following detailed description of the invention, taken with reference to the accompanying drawings, in which:

FIG. 1 is a front elevation of a preferred embodiment of the seat belt device according to the present invention showing the state in which the belt is not in use;

FIG. 3 is an enlarged sectional view of the seat belt device according to the present invention, showing the major parts thereof in greater detail.

Figure 2:
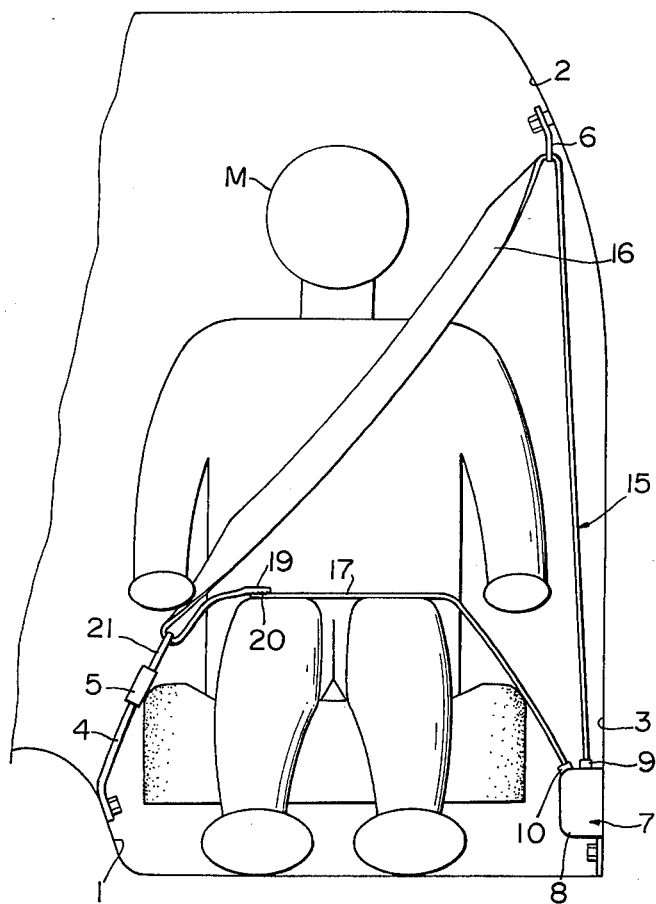
FIG. 2 is a front elevation of the seat belt device shown in FIG. 1, showing the state in which the belt is in use.
Figure 4:
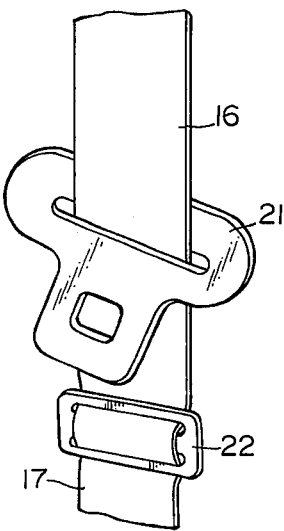
FIG. 4 is a schematic view of a conventional tongue plate stopper means.

Referring now to the drawings, especially to FIGS. 1, 2 and 3, showing a preferred embodiment of a seat belt device according to the present invention, a buckle means 5 is coupled to a bottom member 1 in the car through a coupling piece 4. Attached to a top member 2 is a belt guide means 6, and a retractor 7 is mounted onto a structural member 3, such as a rocker panel.

Said retractor 7 comprises a retractor case 8 having a first belt guide port 9 and a second belt guide port 10, a winding shaft 11 comprising a hollow member having, in a portion of the peripheral wall thereof, an axially disposed belt take-out port 12, and rotatably borne on said retractor case 8, and a rotatable shaft 13 disposed coaxially in said winding shaft 11. Said winding shaft 11 and said rotatable shaft 13 constitute a unitary shaft mechanism.

Said belt 15 is strung in a loop fashion between said belt guide means 6 and said retractor 7 so that a shoulder belt portion 16 and a lap belt portion 17 of said belt 15 can hold an occupant M of the seat by the shoulder and the waist portions, respectively. Said shoulder belt portion 16 is introduced into the retractor 7 from said first belt guide port 9, while said lap belt portion 17 is introduced into the retractor 7 from said second belt guide port 10. In said retractor 7, the shoulder belt portion and the lap belt portion are overlapped one on the other and wound on said winding shaft 11 in an overlapped state. Portion 18 of the belt 15, formed in a ring shape, is folded back at the belt take-out port 12 of the retractor introduced into a peripheral gap 14, and fitted onto said rotatable shaft 13, or is fixed between said rotatable shaft 13 and said belt take-out port 12.

In the preferred embodiment shown in the drawings, said portion 18 of the belt 15 has the root portion 18a thereof stitched together so that the positions of the shoulder belt portion 16 and the lap belt portion 17 cannot be shifted with respect to each other.

A novel feature of the seat belt device according to the present invention is that, in the aforementioned arrangement of the seat belt device, a coupling portion 19 of the belt 15 is constituted of the respective ends of the shoulder belt portion 16 and the lap belt portion 17 coupled together in an overlapped state, and a tongue plate 21 is provided on the shoulder belt portion side of said coupling portion 19.

Although said coupling portion 19 of the belt 15 is shown as being coupled by stitching the ends of the belt together at 20, the coupling means according to the present invention is not limited to such a stitching, but may be embodied in any known forms which can provide a coupling means at 19 with a strength higher than the tensile strength of the belt 15, as long as the ends of the belt portions are overlapped one on the other.

In the aforementioned arrangement of the seat belt device for a vehicle according to the present invention, said coupling portion 19 of the overlapped ends of the seat belt 15 functions as a stopper for the tongue plate 19 when the belt is not in use and is disposed in the vertical position. That is to say, the tongue plate 21 is caught by said coupling portion 19 so that the tongue plate 21 can be prevented from slipping down along the belt 15 when the same is not in use, as indicated in FIG. 1.

When the seat belt 15 is put to use, pulling the shoulder belt portion 16 up will lift up the tongue plate 21 caught by said coupling portion 19. Then the tongue plate can be readily taken, the shoulder belt portion 16 and the lap belt portion 17 strung over the desired portions of the occupant's body, and the tongue plate 21 engaged with the buckle means 5, as indicated in FIG. 2.

Although said coupling portion 19 of the overlapped ends of the belt 15 cannot move in the longitudinal direction of the belt 15 and is positionally fixed in said direction, the occupant of the seat will have no difficulty in using the seat belt even if the operating conditions, such as the position of the seat or the frame of the occupant, vary widely, because the shoulder belt portion 16 and the lap belt portion 17 are drawn out by an equal length when the belt 15 is extended. As fully described hereinbefore, according to the present invention, said coupling portion 19, in which the ends of the shoulder belt portion 16 and the lap belt portion 17 are overlapped one on the other, acts as a stopper for the tongue plate 21 which prevents the tongue plate 21, from slipping down along the belt 15 when the belt is not in use. Also, when the seat belt 15 is put to use, pulling up the belt 15 will lift up the tongue plate 20 caught by said coupling portion 19. Therefore, there is no inconvenience of looking for the tongue plate 21 before use.

Further, according to the present invention, since the tongue plate 21 can be prevented from slipping down only by said coupling means of the overlapped ends of the belt 15, the seat belt device can be fabricated in a simplified construction without the use of an additional tongue plate stopper, thus also contributing to a reduction in the manufacturing cost.

Although not shown in the drawings, the seat belt webbing is secured to the retractor in such a manner that the seat belt webbing is squeezed in the space defined by the rotatable shaft and the winding shaft so as to form a relatively narrower gap, thereby requiring only one stitching operation to form the seat belt webbing into a loop.

What we claim is:

1. A seat belt device for use in a vehicle in which a belt is strung in a loop fashion so as to hold an occupant of a seat of the vehicle by a shoulder belt portion and a lap belt portion of the belt, and a part of the belt is wound on a shaft of a single retractor wherein the ends of said shoulder belt and said lap belt portions are coupled together by being overlapped one on the other to form a coupling portion of greater thickness than said shoulder belt portion, and wherein a tongue plate, having a slit which is wider than the thickness of said shoulder belt portion and narrower that the thickness of said coupling portion, is provided on the shoulder belt portion of the belt, said coupling portion acting as a stopper preventing the tongue plate from slipping down the belt when not in use.

2. A seat belt device for use in a vehicle according to claim 1, wherein the part of the belt wound on a shaft is fixed by being fitted onto a rotatable shaft disposed coaxially within a winding shaft comprising a hollow shaft with a port permitting passage of the belt, and further, wherein the portion of the belt fitted onto the rotatable shaft is stitched together.

3. A seat belt device for use in a vehicle according to claim 1, wherein the retractor includes a retractor case having two belt guide ports through which the shoulder belt and lap belt portions, respectively, of the belt are passed.

4. A seat belt device for use in a vehicle according to claim 1, wherein the end of said shoulder belt portion and the end of said lap belt portion are overlapped one on the other and stitched together to form said coupling portion.

* * * * *